(12) United States Patent
Bauer

(10) Patent No.: US 7,374,709 B2
(45) Date of Patent: May 20, 2008

(54) METHOD OF MAKING CARBON/CERAMIC MATRIX COMPOSITES

(76) Inventor: Dieter Bauer, 9045 S. Kings Hall Pl., Salt Lake City, UT (US) 84121

( * ) Notice: Subject to any disclaimer, the term of this patent is extended or adjusted under 35 U.S.C. 154(b) by 219 days.

(21) Appl. No.: 11/034,020

(22) Filed: Jan. 11, 2005

(65) Prior Publication Data

US 2006/0151912 A1 Jul. 13, 2006

(51) Int. Cl.
*B29C 45/14* (2006.01)
(52) U.S. Cl. ........................ 264/257; 264/319; 264/330
(58) Field of Classification Search ................ 264/653; 427/294
See application file for complete search history.

(56) References Cited

U.S. PATENT DOCUMENTS

| | | | |
|---|---|---|---|
| 3,895,084 A | 7/1975 | Bauer | |
| 3,991,248 A | 11/1976 | Bauer | |
| 5,153,295 A | 10/1992 | Whitmarsh | |
| 5,476,685 A * | 12/1995 | Rocher et al. | 427/249.2 |
| 6,210,786 B1 * | 4/2001 | Atmur et al. | 428/293.4 |
| 6,472,058 B2 * | 10/2002 | Hanzawa et al. | 428/293.4 |
| 7,052,643 B2 * | 5/2006 | Sion | 264/344 |
| 2004/0253377 A1 * | 12/2004 | Bok et al. | 427/249.2 |
| 2005/0176329 A1 * | 8/2005 | Olry et al. | 442/388 |
| 2005/0276961 A1 * | 12/2005 | Sherwood et al. | 428/292.1 |

* cited by examiner

*Primary Examiner*—Steven P. Griffin
*Assistant Examiner*—Russell J Kemmerle

(57) ABSTRACT

A method of making high performance friction materials with tailored levels of a ceramic hard phase to achieve optimum thermal conductivity, friction coefficient and wear performance of composite brake materials. In accordance with one method of the invention specific end-use application friction requirements are satisfied by tailoring the level of carbon in a selected carbon/carbon preform, heat treating the carbon/carbon composite preform, thereby affecting thermal conductivity so as to optimize overall braking performance prior to ceramic processing and by selecting an optimum level of ceramic hard phase to achieve satisfactory friction disc wear life and friction characteristics of the braking material.

1 Claim, 3 Drawing Sheets

IMAGE BY SEM BACK SCATTER TECHNIQUE, SHOWING UNIFORM DISTRIBUTION OF SILICON CARBIDE

SIC MATRIX

100X

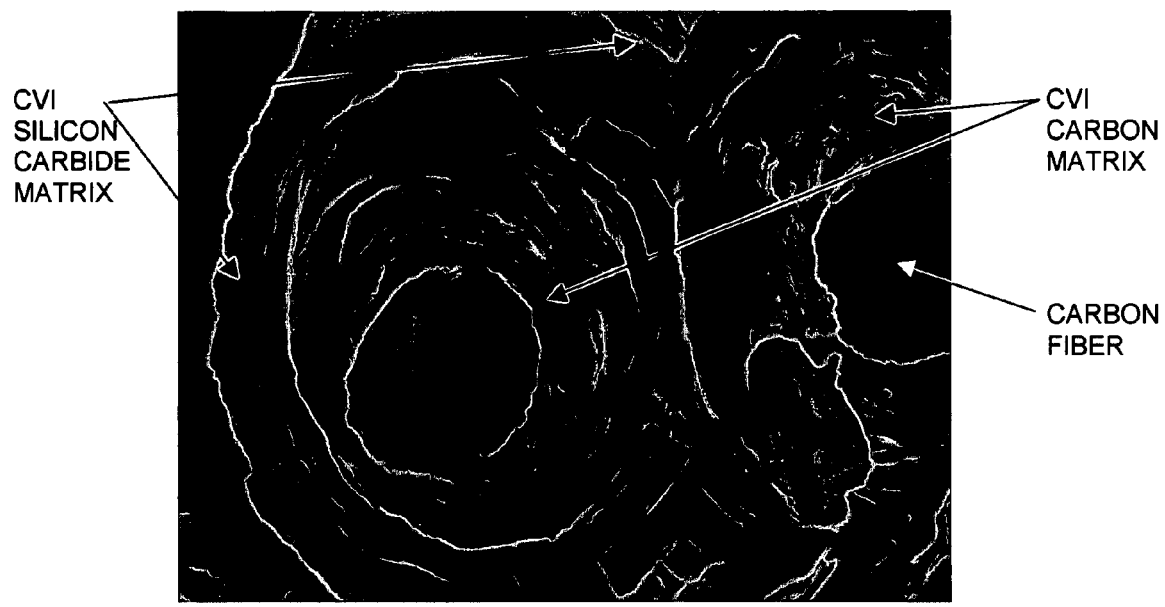
Fig. 5     5000X

METHOD OF MAKING CARBON/CERAMIC MATRIX COMPOSITES

BACKGROUND OF THE INVENTION

1. Field of the Invention

This invention relates generally to carbon/ceramic matrix composites and the method of making same. More particularly, the invention concerns carbon/ceramic matrix composites for use in friction applications.

2. Description of the Prior Art

With the rapid advance of aircraft, nuclear and aerospace and high temperature technologies there is an ever-increasing need for new types of high strength composite materials that are capable of reliably withstanding high temperatures and pressures. Additionally, new methods are required to expeditiously fabricate these materials into articles such as aircraft brake discs.

Carbon/carbon composites are the state-of-the-art friction materials for aircraft brake applications. The majority of today's commercial jets and military fighters are equipped with carbon/carbon brakes.

Carbon fibers, by design, have well oriented crystalline structure aligned along the axis of the fiber. They exhibit good strength and stiffness in the fiber direction.

The ability to combine different carbon fibers with different types of carbon matrices to form a single light weight, economical and functional composite is one of the key reasons for the successful application of carbon/carbon for aircraft brake use. The type and distribution of carbon fiber, the crystalline structures of various carbon matrices, the ratio between soft and hard carbon in the matrix, and the overall composite thermal conductivity all have an impact on final brake performance.

Carbon/carbon was first proposed as an aircraft frictional material in the beginning of 1970s. By the end of 1970s, carbon/carbon brakes were the standard equipment for advanced fighters such as F-14, F-15 and the supersonic Concorde.

Generally speaking, carbon/carbon brakes offer low wear and provide excellent frictional performance at high energy conditions. Additionally, the use of carbon/carbon aircraft brakes significantly adds safety and increases payload.

Prior art carbon/carbon aircraft brakes are generally composed of multiple full-circle rotors and stators of the same material.

The unique friction properties of structural carbon/carbon composite brake materials have now been fully established for multi-disc rotor/stator braking systems for commercial and fighter aircraft, as well as for caliper/single disc applications for helicopters, industrial, automotive and train braking applications. Carbon/carbon braking materials are currently manufactured in large volume production quantities, especially for commercial and military aircraft. Wear life and friction coefficients are at predictable levels and cannot be significantly influenced by carbon/carbon processing conditions.

The technology for densifying carbon fiber substrates by liquid pitch or resin impregnation, carbonization and graphitization or chemical vapor infiltration of pyrolytic carbon, with subsequent composite heat treatment is fully established and a variety of carbon/carbon products are routinely manufactured including complex aerospace components, high temperature furnace hardware, components for the Semi-Conductor Industry, brake discs for commercial and military aircraft, as well as for automotive and other commercial applications.

Densification by the chemical vapor infiltration (CVI) process is the most popular manufacturing process in the industry to date for the manufacture of carbon/carbon composite friction materials for aircraft braking systems. Fiber volume for the carbon substrates may range from 20%-30%. Depending on initial carbon fiber density, fiber volume and number and length of pyrolytic carbon infiltration furnace runs, the fully densified carbon/carbon composite product may range in density from 1.5 g/cc to 1.85 g/cc.

Two of the early patents concerned with carbon/carbon aircraft brakes and the methods for making the brake discs, namely U.S. Pat. Nos. 3,895,084 and 3,991,248 were issued to the present inventor. These patents describe unique substrate optimization techniques as well as novel methods for accurate control of product shape, cross-sectional configuration, density, fiber volume and internal fiber orientation.

One of the drawbacks of prior art carbon/carbon brakes is that they typically yield lower frictional coefficients, which tend to vary widely at different speed and landing energy. Carbon/carbon is also susceptible to oxidation damage, which not only degrades its structural integrity over long-term usage, but also promotes accelerated wear.

In the past, considerable development work has been carried out to develop a ceramic matrix composite (CMC) friction material that exhibits improved friction properties over carbon/carbon brake materials.

These efforts have largely focused on material systems that are based on either silicon melt infiltration and carbide conversion, or pre-ceramic polymer impregnation of carbon fiber mats, resulting in ceramic matrix composites after pyrolyzation. This work has to date, not been particularly successful for aircraft braking applications.

Another early development effort is described in U.S. Pat. No. 5,153,295 issued to whitmarsh et al., entitled "Carbosilane Polymer Precursors To Silicon Carbide Ceramics". This patent describes a process for the preparation of compositions of matter which have potential utility as precursors to silicon carbide (SiC) wherein the compositions are obtained by a Grignard coupling process starting from chlorocarbosilanes. The precursors constitute a type of polycarbosilane that is characterized by a branched, $[Si-C]_n$"backbone" comprised of $SiR_3CH_2-$, $-SiR_2CH_2-$, $=SiRCH_2-$, and $\equiv SiCH_2-$ units (where R is usually H but can also be other organic or inorganic groups, e.g., lower alkyl or alkenyl, as may be needed to promote crosslinking or to modify the physical properties of the polymer or the composition of the final ceramic product). A key feature of these polymers is that substantially all of the linkages between the Si—C units are "head-to-tail", i.e., they are Si to C.

Recently, considerable effort has been directed toward developing ceramic matrix composites (CMC) that are specially aimed at aircraft braking applications. Much of this work has been based on pre-ceramic polymer impregnation of carbon fiber preforms that may undergo as many as twelve polymer impregnations before the desired final density is reached. Typically the pre-ceramic polymer forms the ceramic matrix after pyrolyzation between about 850° C. and about 1600° C.

One of the goals of the present invention is to further optimize carbon/ceramic friction material by identifying key material process variables and systematically correlating the resulting carbon/ceramic matrix composites with brake performance and to develop reproducible and cost effective processing steps to fabricate carbon/ceramic matrix composites for future brake applications.

DISCUSSION OF THE INVENTION

Definition of Terms a. Carbon Fibers: Carbon fibers are fibers produced by the heat treating of both natural and synthetic fibers of materials such as, for example, wool, rayon, polyacrilonitrile (PAN) and pitch at temperatures on the order of 1000° C. or more.
b. Graphite Fibers: Graphite fibers are fibers produced by the heat-treating of carbon fibers at graphitizing temperatures on the order of 2000° C. or more.
c. Pyrolytic Carbon: Pyrolytic carbon, as the term is used herein, refers to the carbon material which is deposited on a substrate by the thermal pyrolysis of a carbon-bearing vapor over the temperature range of 800° C. to 1200° C.
d. Pyrolytic Graphite: Pyrolytic graphite is a trade name which has been given to carbon deposited from a hydrocarbon gas over the temperature range of 1750° C. to 2250° C. It is a specific high temperature form of pyrolytic carbon.
e. Pyrolytic Carbon Infiltration: Pyrolytic carbon infiltration is a term used to describe the carbon densification processing of porous fibrous and particulate substrates.

One aspect of one form of the process of the present invention involves the chemical vapor infiltration of pyrolytic carbon into a carbon fibrous preform and the tailored impregnation of a pre-ceramic polymer or CVI ceramic product at various stages of the carbon/carbon densification process to achieve the required friction coefficient and wear performance. Additionally, particulate fillers may be used in this process to further affect the rate of densification, thermal conductivity and friction properties.

When using the pre-ceramic polymer process as source for the ceramic friction modifier, depending upon polymer mass for a given furnace run, heat-up rates and temperature holds for producing an acceptable ceramic matrix composite may vary. Typically, the polymer is cured or cross linked at a temperature of about 400° C. in an inert atmosphere.

Pyrolysis is accomplished at about 100° C. above the maximum expected end-use temperature or 850° C., whichever is greater. In carrying out the method of the invention, an optimum pyrolyzation rate has to be carefully followed based on the mass of the parts and the level of pre-ceramic polymer used. Additionally, the ramp rate for pyrolyzation has to be carefully selected to avoid blistering or delamination of parts.

Pyrolysis done at 1000° C. will yield about an 80-85% ceramic mass. However, when pyrolysis is carried out at about 1600° C. the mass yield will change to about 75-80%. Pyrolysis of AHPCS and related hydridopolycarbosilanes to temperatures of about 850° C. to about 1,000° C. will result in a ceramic that is amorphous (non-crystalline) silicon carbide (SiC), whereas pyrolysis carried out to 1600° C. will result in a ceramic that is a crystalline beta silicon carbide (SiC).

In carrying out the carbon/ceramic friction modifier process of the present invention, any of the currently practiced carbon fiber substrate constructions for the manufacture of carbon/carbon composites can be employed.

In order to achieve optimum levels of a ceramic hard phase versus soft carbon/carbon phase the carbon fiber substrate is infiltrated with pyrolytic carbon followed by high temperature heat-treatment to reach the required initial carbon composite density, that is, porosity level, suitable for subsequent ceramic processing and to allow the required ratio of ceramic hard phase versus soft carbon/carbon phase to be achieved.

Depending on the density and open porosity of the carbon/carbon composite and the desired ultimate level of a hard phase, the carbon composite is then infiltrated with a hard carbide or nitride from a vapor phase or liquid impregnated with a pre-ceramic polymer. For the pre-ceramic polymer process, the amount of the hard phase will be tailored for the desired end-use of the material by the number of polymer impregnation and pyrolyzation runs used. For example, in accordance with the method of the present invention, in a first, or Type A process sequence, two to three impregnation runs are accomplished. The first friction discs thus produced are dynamically tested to determine their strength and friction characteristics.

This done, a second, or Type B process sequence will be accomplished wherein five to seven impregnation runs are accomplished. The second friction discs produced by this process will then be tested to determine their strength and friction characteristics and these characteristics will be compared with those of the first friction discs. Finally, a third, or Type C process sequence will be accomplished wherein seven to nine impregnation runs are accomplished. The third friction discs thus produced will be carefully tested and their strength and friction characteristics will be compared with those of the first and second discs.

The carbon fiber substrate will be infiltrated with pyrolytic carbon to reach the required initial carbon composite density, i.e., porosity level, suitable for subsequent ceramic processing and to allow the required ratio of ceramic hard phase versus soft carbon/carbon phase to be achieved.

Once the desired carbon composite density is achieved, the carbon/carbon disc preforms may be heat-treated to between about 1600° C. and about 2500° C. to impart the required end-use thermal properties. A final CVI carbon infiltration run after all ceramic processing has been completed, will bring the composite to its optimum strength while, by the nature of the infiltration and coating process, the pyrolytic carbon will reinforce the ceramic phase, locking the hard ceramic product in place within the open porosity of the carbon/carbon composite and aid in achieving the desired thermal conductivity level in the final product.

It is to be understood that the selected fiber preform and its construction determine the structural (tensile) strength of the carbon/ceramic matrix composite and the distribution of both fiber and matrix. Molded chopped fiber preforms, two-dimensional lay-ups and three-dimensional, needled carbon fiber preforms are proven and have been widely used for aircraft brake application.

Due to the nature of the pore structure in the various preform types, each preform type responds differently to different densification processes.

It is also to be understood that Silicon Carbide (SiC) matrix composites generated from different densification processes exhibit different purity and crystalline structure which translates to different thermal and physical properties. For example, 1000° C. pyrolyzed, SiC derived from the pre-ceramic polymer process (Starfire System) is amorphous in nature. It can be converted to beta phase after 1600° C. post processing.

Pre-ceramic polymer impregnation processing and pyrolyzation, generally speaking, provides more uniform densification through the thickness of the composite. Chemical vapor infiltration (CVI) deposited SiC on the other hand is very crystalline. SiC derived from melt infiltration depends heavily on the process and filler composition. Pure unreacted silicon metal is often present in the final matrix. Being a lower melting material, free silicon is considered as undesirable for brake applications especially under high energy input condition for aircraft.

A fibrous substance for carbon/carbon densification may employ rayon precursor fibers, pitch or PAN (polyacrillonitrile) fibers. Substrates may be constructed using chopped pitch or PAN fiber molding compounds with phenolic resin or laminated graphite cloth prepreg, again with phenolic resin.

The substrate can also be assembled from dry graphite cloth layers and compacted in a fixture to achieve a certain fiber volume. Similarly fiber mat layers, needled or stacked, can be compressed during carbonization and subsequent densification to achieve the required fiber volume for a given application.

Carbon/carbon densification can be based on a multiple pitch or phenolic resin low pressure impregnation and carbonization (Lopic) process. High temperature graphitization heat-treat runs are inserted after carbonization.

Heat treating the composite will cause fiber and matrix shrinkage, opening up more porosity to more readily facilitate subsequent additional liquid impregnation and carbonization runs to ultimately reach composite density levels of 1.6 g/cc to 2.1 g/cc.

Any of the currently practiced carbon fiber substrate constructions for the manufacture of carbon/carbon composites can be employed for the carbon/ceramic friction modifier process of the present invention.

This process is based upon chemical vapor infiltration of pyrolytic carbon into a carbon fibrous preform in addition to tailored impregnation of a pre-ceramic polymer or CVI ceramic product at various stages of the carbon/carbon densification process.

Additionally, particulate fillers may be used in the pre-ceramic polymer impregnation process to further affect friction properties and rate of densification.

Once the desired carbon composite density is achieved, the carbon/carbon disc preforms are heat treated to between 1600° C. to 2500° C. to impart the required end-use thermal properties. A final CVI carbon infiltration run after all ceramic processing has been completed, will bring the composite to its optimum strength level while, by the nature of the infiltration and coating process, the pyrolytic carbon will reinforce the ceramic phase locking the hard ceramic product into place within the open porosity of the carbon/carbon composite and aid in achieving the desired thermal conductivity level in the final product.

The deposition temperature required, $CH_4$ gas flow rate and pressure level for CVI carbon densification are well established. The level of final pyrolytic carbon placed into the pores of the carbon/ceramic composite is controlled by the length of the CVI carbon run and is based on the desired ratio of ceramic hard phase versus soft carbon/carbon phase.

SUMMARY OF THE INVENTION

It is an object of the present invention to optimize carbon/ceramic friction material candidates by identifying key material process variables and then systematically correlating the resulting carbon/ceramic matrix composites with brake performance.

More particularly, it is an object of the present invention to create a new family of high performance friction materials with tailored levels of a ceramic hard phase to allow optimization of thermal conductivity, friction coefficient and wear performance of carbon/ceramic composite brake materials.

Another object of the invention is to develop reproducible and cost effective processing steps to fabricate carbon/ceramic matrix composites for future brake applications.

By way of brief summary the methods of the present invention are adapted to satisfy specific end-use application friction requirements by tailoring the level of carbon in the carbon/carbon preform, heat treating the carbon/carbon composite preform, thereby affecting thermal conductivity to optimize overall braking performance prior to ceramic processing and by selecting a certain level of ceramic hard phase to achieve the friction disc wear life and friction coefficient desired.

BRIEF DESCRIPTION OF THE DRAWINGS

FIG. 5 is a scanning electron microscope image at a magnification of 5000 of a CVI carbon densified, 3D needled, PAN fiber mat, followed by CVI SIC processing.

DESCRIPTION OF THE INVENTION

Carbon Fiber Preform Fabrication

Figure 1:
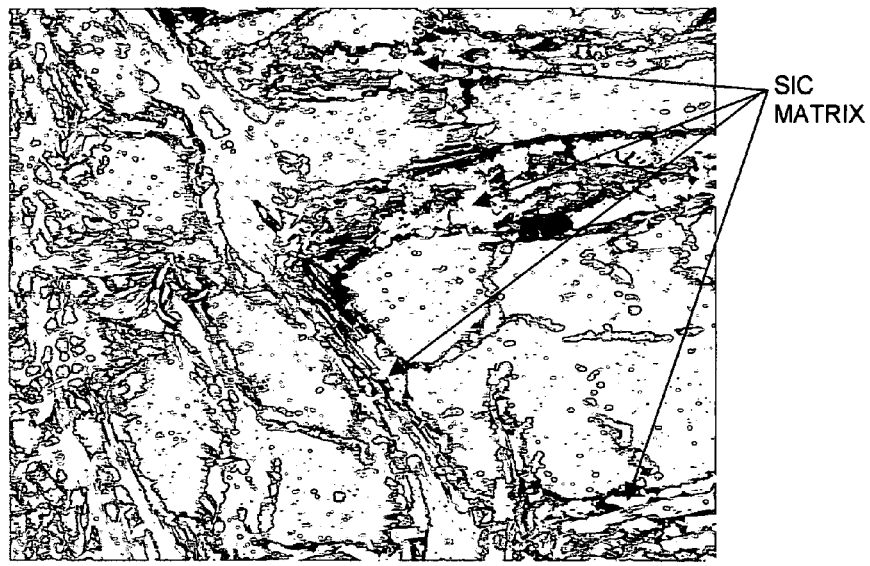
FIG. 1 is a scanning electron microscope image at a magnification of 100 of a 3D carbon/carbon preform after densification with pre-ceramic polymer and conversion to Beta-Silicon Carbide at 1600° C.

In carrying out the methods of the present invention, various types of carbon fiber substrates are used.

One such substrate, namely a needled PAN fiber carbon mat substrate comprises a continuous filament, polyacrylonitrile (PAN) fiber tow having a filament count of approximately 320 K. The tow stabilization temperature is on the order of 200° C.-300° C. The substrate preferably has a fiber mat lay-up orientation of between about 0° and about plus or minus 60°. The fiber volume as needled, prior to carbonization, is on the order of 50%.

Carbonization of the PAN fiber mat is accomplished in about a five-day carbonization run and fiber volume after carbonization is approximately 25%. After carbonization and prior to carbon/carbon densification, the fiber mat is vacuum heat-treated at a temperature of about 1700° C. The carbon fiber preform density after heat treatment is approximately 0.5 g/cc.

Another substrate, namely a PAN fiber, eight harness satin graphite fabric substrate comprises a phenolic resin prepreg having about a 30% resin content and a fiber volume of between about 30% and about 35%. The graphite fabric of the substrate is heat-treated at between about 2000° C. and about 2300° C. prior to prepreg manufacture.

The preform laminate is formed by platen press or autoclave compaction and is appropriately cured and carbonized. Carbonization is to a maximum temperature of 750° C. resulting in a disc substrate blank ready for pitch impregnation or CVI carbon processing. Disc blank density after carbonization is between 0.5 g/cc and 0.7 g/cc.

Carbon/Carbon Densification

In one form of the densification method of the invention the needled PAN fiber carbon mat substrate is densified by chemical vapor infiltration (CVI) of carbon at a deposition temperature of approximately 1000° C. at a pressure of about 25 mm with a methane ($CH_4$) flow rate of about 170 SCFH. The deposition time per run is between about 75 and about 120 hours. Typically one or two infiltration runs will be required to achieve a carbon/carbon sample density after densification on the order of about 1.15 g/cc to about 1.3 g/cc. Following CVI carbon densification, the carbon/carbon composite is heat treated at a temperature of between about 1600° C. and about 2500° C. The resulting composite is then machined to remove at least 0.050 inch per side from each friction surface and at least 0.250 inch per side from the inside and outside diameters.

In another form of the densification method of the invention the needled PAN fiber carbon mat substrate is densified by chemical vapor infiltration (CVI) of carbon at a deposition temperature of approximately 1000° C. at a pressure of about 25 mm with a methane ($CH_4$) flow rate of about 170 SCFH. The deposition time per run is about 120 hours. In this form of the method of the invention three or four infiltration runs are accomplished to achieve a carbon/carbon sample density after densification of on the order of about 1.5 g/cc to about 1.6 g/cc.

Following CVI carbon densification, the carbon/carbon composite is once again heat-treated at a temperature of between about 1600° C. and about 2500° C. The resulting composite is then machined to remove at least 0.050 inch per side from each friction surface and at least 0.250 inch per side from the inside and outside diameters.

In still another form of the densification method of the invention the needled PAN fiber carbon mat substrate is densified by chemical vapor infiltration (CVI) of carbon at a deposition temperature of approximately 1000° C. at a pressure of about 15 mm with a methane ($CH_4$) flow rate of about 220 SCFH. The deposition time per run is once again between about 75 and about 120 hours. In this form of the method of the invention three or four infiltration runs are accomplished to achieve a carbon/carbon sample density after densification of about 1.5 g/cc to about 1.6 g/cc. Following CVI carbon densification, the carbon/carbon composite is once again heat-treated at a temperature of between about 1600° C. and about 2500° C.

The resulting composite is then machined to remove at least 0.050 inch per side from each friction surface and at least 0.250 inch per side from the inside and outside diameters.

In yet another form of the densification method of the invention the needled PAN fiber carbon mat substrate is densified by chemical vapor infiltration (CVI) of carbon at a deposition temperature of approximately 1000° C. at a pressure of about 15 mm with a methane ($CH_4$) flow rate of about 220 SCFH. The deposition time per run is between about 75 and about 120 hours. In this latest form of the method of the invention four to six infiltration runs are accomplished to achieve a carbon/carbon sample density after densification of on the order of about 1.68 g/cc to about 1.73 g/cc. Following CVI carbon densification, the carbon/carbon composite is once again heat-treated at a temperature of between about 1600° C. and about 2500° C. The resulting composite is then machined to remove at least 0.050 inch per side from each friction surface and at least 0.250 inch per side from the inside and outside diameters.

In one form of the densification method of the invention, the PAN fiber, eight harness satin graphite fabric substrate, following preform carbonization, the laminate preform blank is pitch impregnated, carbonized again and then heat-treated to a temperature of approximately 1700° C.

The low pressure pitch impregnation, carbonization and composite heat treatment (Lopic) cycles are repeated until the disc blank density is on the order of about 1.15 g/cc to about 1.3 g/cc.

Following densification, the carbon/carbon composite is once again heat-treated at a temperature of between about 1600° C. and about 2500° C. The resulting composite is then machined to remove at least 0.050 inch per side from each friction surface and at least 0.250 inch per side from the inside and outside diameters.

Final CVI Carbon, Post Ceramic Processing Run

The final chemical vapor infiltration run to deposit pyrolytic carbon into the carbon/ceramic composite blank is only employed after all ceramic processing has been completed and the carbon/ceramic composite has been exposed to its maximum process temperature.

CVI Carbon deposition temperature ~1000° C.
Pressure—10 mm
Methane ($CH_4$) flow rate 220 SCFH
Deposition time per run—50 to 120 hours
Number of infiltration runs—1

Ceramic Phase Processing

By way of summary, two methods for ceramic hard phase insertion into the carbon/carbon preform can be employed in the performance of the methods of the invention. These are: pre-ceramic polymer impregnation and conversion to Silicon Carbide or by the CVI Carbide gas phase deposition process.

Ceramic Phase Processing by Pre-Ceramic Polymer Impregnation and Pyrolyzation

The pre-ceramic polymer used for this process was developed by Starfire Systems, Inc. of Watervliet, N.Y. and is described in U.S. Pat. No. 5,153,295 entitled "Carbosilane Polymer Precursors to Silicon Carbide Ceramics."

Detailed pre-ceramic polymer impregnation, curing, and pyrolyzation process information is available from Starfire Systems, Inc. and is set forth in an information sheet entitled "Curing and Pyrolyzing AHPCS SiC Precursor Polymer Product Information Sheet."

By way of example, pyrolysis done at 1000° C. will yield 80-85% ceramic mass. When pyrolysis is carried out at 1600° C., the mass yield will change to 75-80%. Pyrolysis of AHPCS and related Hydridopolycarbosilanes to temperatures of 850° C. to 1,100° C. will result in a ceramic that is amorphous (non-crystalline) silicon carbide (SiC).

By pyrolyzing the part, in an inert atmosphere to 1600° C., with a hold time at maximum temperature of 6-8 hours, the matrix is converted to a crystalline beta—SIC. The crystallization heating rate from room temperature to 1600° C. is 2° C./minute.

The following paragraphs set forth exemplary ceramic processes by pre-ceramic polymer impregnation and high temperature conversion to Silicon Carbide using Starfire Systems Inc. AHPCS SiC precursor polymer. The ceramic processes listed for Type A, Type B, and Type C carbon/ ceramic friction materials, when matched with the appropriate density and porosity level of heat-treated carbon/carbon preforms (i.e. approximately 1.68 to 1.73 g/cc, 1.5 to 1.6 g/cc and 1.15 to 1.3 g/cc respectively), are designed to result in three different friction materials with either light level (Type A), medium level (Type B), or heavy level (Type C) ceramic hard phase in a heat-treated carbon/carbon base material.

In all cases, in the final impregnation/pyrolysis (impreg/pyro) cycle for each group of pre-ceramic densification lots, the discs will be exposed to at least 1600° C. in the pyrolyzation run.

Ceramic Process Sequence-Type A Carbon/Ceramic Material (2-3 Impregnation/Pyrolysis (Impreg/Pyro) Cycles)

In carrying out Impreg/Pyro Cycle No. 1 of the Ceramic Process Sequence-Type A, a selected carbon/carbon disc preform (such as a porous precursor substrate formed by infiltrating a first carbon fiber substrate with pyrolytic carbon, with a carbon/carbon preform density level in the approximate range of 1.68 g/cc to 1.73 g/cc) and heat-treated to between about 1600° C. and about 2500° C. to form a heat-treated carbon/carbon preform), is first vacuum impregnated with a pre-ceramic polymer, such as the pre-ceramic polymer developed by Starfire Systems, Inc.

In accomplishing this step, before the polymer is introduced into the vacuum chamber, the chamber is evacuated to a vacuum of below about 250 millitorr and is maintained at this vacuum level for about one hour per inch of thickness of the part. During the actual part impregnation step, the polymer is slowly introduced into the selected preform in a manner as to totally immerse the selected preform.

Once the part is thus impregnated to produce a first impregnated preform, the vacuum chamber is appropriately vented to atmosphere.

The next step in carrying out Impreg/Pyro Cycle No. 1 of Sequence-Type A is to controllably cure the first impregnated preform.

This curing step is accomplished under about 150 pounds per square inch (psi) of inert gas, such as nitrogen with a cure heating rate of approximately 1° C. to 3° C./minute, depending on part thickness to a temperature of about 400° C. for approximately one hour.

Following the cure step, the thusly produced first cured preform is pyrolyzed. In accomplishing this step, an inert gas, such as nitrogen or argon is first caused to flow into the pyrolysis retort at a rate which will cause roughly one retort volume change every thirty minutes.

Once the retort is sufficiently purged, the cured preform is heated at a rate of about 1° C. to 2° C./minute to approximately 1,000° C. and is maintained at this temperature for approximately one hour to produce a first impregnated and pyrolyzed preform (first impreg).

In carrying out Impreg/Pyro Cycle No. 2, the first impreg is vacuum impregnated with the pre-ceramic polymer to form a second impregnated preform and cured in the manner described in the preceding paragraph to produce a cured second impregnated preform. This done, cured second impregnated preform is pyrolyzed in the manner previously described at approximately 1000° C. for about one hour to produce a pyrolyzed second impregnated preform. The pyrolyzed second impregnated preform is then machined to within 5% of final dimensions to prepare the second impregnated preform for the third impregnation cycle.

In carrying out Impreg/Pyro Cycle No. 3, the machined and pyrolyzed second impregnated preform is vacuum impregnated to form a further impregnated third impregnated preform and cured in the manner described in the preceding paragraphs to produce a cured third impregnated preform. This done, cured third impregnated preform is pyrolyzed in the manner previously described, but at a pyrolyzation temperature of approximately 1600° C. for about eight hours to form a third impregnated and pyrolyzed preform. The third impregnated preform is then machined flat and parallel removing approximately 0.025" from all surfaces to form a fourth impregnated and pyrolyzed preform which is ready for post ceramic processing.

Next, the fourth impregnated and pyrolyzed preform is heated to a temperature of about 1,000° C. to form a heated fourth impregnated preform and controllably infiltrated with methane ($CH_4$) in the manner previously described at a pressure of about 10 mm and a methane flow rate of approximately 220 SCFH for about 50 to 120 hours to form a first friction disc.

Following the final CVI carbon run the first friction disc thus formed is machined to final dimensions to form a final friction disc. This done, the final friction disc is tested in the following manner to determine strength and friction characteristics.

Initially, the final friction disc is placed on a dynamometer in the configuration of rotors and stators in a multi-disc wheel set and tested under typical aircraft braking conditions over a range of operating conditions representative of landing, taxi, over-load and rejected takeoff conditions.

Additionally, the compressive strength, fracture toughness and thermal conductivity of the disc are tested. Finally, using microscopy techniques the level of the pyrolytic carbon deposition, carbon fiber/carbon matrix interface and the distribution of SiC within the disc are determined and the density and the open porosity exhibited thereby are determined, all in a manner well understood by those skilled in the art.

Ceramic Process Sequence-Type B Carbon/Ceramic Material (5-7 Impreg/Pyro Cycles)

In carrying out Impreg/Pyro Cycle No. 1 of the Ceramic Process Sequence-Type B, a selected carbon/carbon disc or second carbon fiber disc having a carbon/carbon preform density level of approximately 1.5 g/cc to 1.6 g/cc, heat-treated to between about 1600° C. and about 2500° C., is first vacuum impregnated with a pre-ceramic polymer, such as the pre-ceramic polymer developed by Starfire Systems, Inc., in the same manner as described in the Type A Carbon/Ceramic Material sequence to form an alternate first impregnated part. The next step in carrying out the Type B Impreg/Pyro Cycle No. 1 is to controllably cure the alternate first impregnated part. This curing step is accomplished under about 150 pounds per square inch (psi) of inert gas, such as nitrogen, with a cure heating rate of approximately 1° C. to 3° C./minute, depending on part thickness to a temperature of about 400° C. for approximately one hour.

Following the cure step, the thusly produced cured alternate first impregnated part is pyrolyzed. In accomplishing this step, an inert gas, such as nitrogen or argon is first caused to flow into the pyrolysis retort at a rate which will cause roughly one retort volume change every thirty minutes.

Once the retort is sufficiently purged, the alternate cured part is heated at a rate of about 1° C. to 2° C./minute to approximately 1,000° C., and is maintained at this temperature for approximately one hour to produce an alternate first impregnated and pyrolyzed preform.

In carrying out Impreg/Pyro Cycle No. 2, of the Type B Process Sequence the alternate first impregnated preform is vacuum impregnated with the pre-ceramic polymer and cured in the manner described in the Type A sequence to produce a cured alternate second impregnated preform. This done, the preform is pyrolyzed in the manner previously described at approximately 1000° C. for about one hour to produce a pyrolyzed alternate second impregnated preform. The pyrolyzed preform thus formed is then machined to within 5% of final dimensions to produce an alternate third impregnated preform.

In carrying out the Impreg/Pyro Cycle No. 3, of the Type B Process Sequence, the alternate second impregnated and machined preform is vacuum impregnated and cured in the manner described in the preceding paragraphs to produce a cured alternate third impregnated preform.

This done, cured preform is pyrolyzed in the manner previously described at approximately 1000° C. for about one hour to produce an alternate third impregnated and pyrolyzed preform.

In carrying out Impreg/Pyro Cycle No. 4, of the Type B Process Sequence, the alternate third impregnated preform is vacuum impregnated and cured in the manner described in the preceding paragraph to produce a cured alternate fourth impregnated preform. This done, cured alternate fourth impregnated preform is pyrolyzed in the manner previously described at approximately 1000° C. for about one hour to produce an alternate fourth impregnated and pyrolyzed preform. This done, the alternate fourth impregnated preform is machined to remove approximately 0.025" from all surfaces to prepare the alternate fourth impregnated and pyrolyzed preform for the fifth impregnation cycle.

In carrying out Impreg/Pyro Cycle No. 5, of the Type B Process Sequence, the alternate fourth impregnated preform is vacuum impregnated and cured in the manner described in the preceding paragraphs to produce a cured alternate eighth impregnated preform. This done, the cured alternate fifth impregnated preform is pyrolyzed to about 1600° C. for about eight hours to produce an alternate fifth impregnated and pyrolyzed preform. This done, the alternate fifth impregnated preform is machined flat and parallel removing approximately 0.025" from all surfaces to prepare the alternate fifth impregnated preform for the sixth impregnation cycle.

In one form of the method of the invention the alternate fifth impregnated and pyrolyzed preform is formed into a second alternate final friction disc and tested in the manner previously described. The test data thusly developed is then compared with the earlier developed test data.

In an alternate form of the method of the invention, or Impreg/Pyro Cycle No. 6, of the Type B Process Sequence, the alternate fifth impregnated preform is vacuum impregnated and cured in the manner described in the preceding paragraph to produce a cured alternate sixth impregnated preform. This done, cured alternate sixth impregnated preform is pyrolyzed to about 1000° C. for about one hour to produce an alternate sixth impregnated and pyrolyzed preform.

In carrying out Impreg/Pyro Cycle No. 7, of the Type B Process Sequence, the alternate sixth impregnated preform is vacuum impregnated and cured in the manner described in the preceding paragraphs to produce a cured alternate seventh impregnated preform. This done, the cured alternate seventh impregnated preform is pyrolyzed to about 1600° C. for about eight hours to produce an alternate seventh impregnated and pyrolyzed preform.

Following Impreg/Pyro Cycle No. 7, of the Type B Process Sequence, the alternate seventh impregnated preform is machined to remove at least 0.025" from all surfaces to produce an alternate third friction disc which is ready for post ceramic processing.

Following the final CVI carbon run, which is accomplished in the same manner as discussed in the Ceramic Process Sequence-Type A, the alternate third friction disc is machined to final dimensions and tested in the same manner as discussed in the Ceramic Process Sequence-Type A. This done, the test results are carefully compared with the previously developed test results.

Ceramic Process Sequence-Type C Carbon/Ceramic Material (7-9 Impreg/Pyro Cycles)

In carrying out Impreg/Pyro Cycle No. 1 of the Ceramic Process Sequence-Type C, a selected carbon/carbon disc preform or third precursor preform with a carbon/carbon preform density level of approximately 1.15 g/cc to 1.3 g/cc heat-treated to between about 1600° C. and about 2500° C., is first vacuum impregnated with a pre-ceramic polymer, such as the pre-ceramic polymer developed by Starfire Systems, Inc. in the same manner as described in the Type A Carbon/Ceramic Material sequence.

The next step in carrying out the Impreg/Pyro Cycle No. 1, of the Type C Process Sequence is to controllably cure the thusly impregnated part. This curing step is accomplished under about 150 pounds per square inch (psi) of inert gas, such as nitrogen with a cure heating rate of approximately 1° C. to 3° C./minute, depending on part thickness to a temperature of about 400° C. for approximately one hour.

Following the cure step, the thusly produced first alternate-1 (alt.-1) cured part is pyrolyzed. In accomplishing this step, an inert gas, such as nitrogen or argon is first caused to flow into the pyrolysis retort at a rate which will cause roughly one retort volume change every thirty minutes.

Once the retort is sufficiently purged, the alt.-1 cured part is heated at a rate of about 1° C. to 2° C./minute to approximately 1,000° C. and is maintained at this temperature for approximately one hour to produce a first impregnated and pyrolyzed, alternate-1 preform (first alt-1 impreg).

In carrying out Impreg/Pyro Cycle No. 2, of the Type C Process Sequence, the first alt.-1 impreg is vacuum impregnated with the pre-ceramic polymer and cured in the manner described in the Type A sequence to produce a cured second alt.-1 impreg. This done, cured second alt.-1 impreg is pyrolyzed in the manner previously described at approximately 1000° C. for about one hour to produce a pyrolyzed second alt.-1 impreg. The pyrolyzed second alt.-1 impreg is then machined to within 5% of final dimensions to prepare the second alt.-1 impreg for the third impregnation cycle.

In carrying out the Impreg/Pyro Cycle No. 3, of the Type C Process Sequence, the second alt.-1 impreg is vacuum impregnated and cured in the manner described in the preceding paragraphs to produce a cured third alt.-1 impreg. This done, cured third alt.-1 impreg is pyrolyzed in the manner previously described at approximately 1000° C. for about one hour to produce a pyrolyzed third alt.-1 impreg.

In carrying out Impreg/Pyro Cycle No. 4, of the Type C Process Sequence, the third alt.-1 impreg is vacuum impregnated and cured in the manner described in the preceding paragraph to produce a cured fourth alt.-1 impreg. This done, cured fourth alt.-1 impreg is pyrolyzed in the manner previously described at approximately 1000° C. for about one hour to produce a pyrolyzed fourth alt.-1 impreg.

This done, the fourth alt.-1 impreg is machined to remove approximately 0.025" from all surfaces to prepare the fourth alt.-1 impreg for the fifth impregnation cycle.

In carrying out Impreg/Pyro Cycle No. 5, of the Type C Process Sequence, the fourth alt.-1 impreg is vacuum impregnated to produce a fifth alt.-1 impreg and cured in the manner described in the preceding paragraphs to produce a cured fifth alt.-1 impreg. This done, cured fifth alt.-1 impreg is pyrolyzed to about 1600° C. for about eight hours to produce a pyrolyzed fifth alt.-1 impreg. This done, the fifth alt.-1 impreg is machined flat and parallel removing approximately 0.025" from all surfaces to prepare the fifth alt.-1 impreg for the sixth impregnation cycle.

In carrying out Impreg/Pyro Cycle No. 6, of the Type C Process Sequence, the fifth alt.-1 impreg is vacuum impregnated and cured in the manner described in the preceding paragraph to produce a cured sixth alt.-1 impreg. This done, cured sixth alt.-1 impreg is pyrolyzed to about 1000° C. for about one hour to produce a sixth pyrolyzed alt.-1 impreg.

In carrying out Impreg/Pyro Cycle No. 7, of the Type C Process Sequence, the sixth alt.-1 impreg is vacuum impregnated and cured in the manner described in the preceding paragraphs to produce a cured seventh alt.-1 impreg. This done, cured seventh alt.-1 impreg is heated to about 1000° C. for about one hour to produce a seventh pyrolyzed alt.-1 impreg.

In carrying out Impreg/Pyro Cycle No. 8, of the Type C Process Sequence, the seventh alt.-1 impreg is vacuum impregnated and cured in the manner described in the preceding paragraphs to produce a cured eighth alt.-1 impreg. This done, cured eighth alt.-1 impreg is pyrolyzed in the manner previously described at approximately 1000° C. for about one hour to produce an eighth pyrolyzed alt.-1 impreg. This done the eighth alt.-1 impreg is machined to remove approximately 0.025" from all surfaces to prepare the eighth alt.-1 impreg for the ninth impregnation cycle.

In carrying out Impreg/Pyro Cycle No. 9, of the Type C Process Sequence, the eighth alt.-1 impreg is vacuum impregnated to produce a ninth alt.-1 impreg and cured in the manner described in the preceding paragraphs to produce a cured ninth alt.-1 impreg. This done, cured ninth alt.-1 impreg is pyrolyzed to about 1600° C. for about eight hours to produce a ninth pyrolyzed alt.-1 impreg. By pyrolyzing the part in an inert atmosphere to 1600° C. with a hold time of about eight hours, the matrix is converted to a crystalline beta-SiC.

This done, the ninth alt.-1 impreg is machined flat and parallel removing approximately 0.025" from all surfaces to produce a ninth machined alt.-1 impreg.

Following Impreg/pyro cycle No. 9, the ninth alt.-1 impreg is now ready for post ceramic processing.

Following the final CVI carbon run, which is accomplished in the same manner as discussed in the Ceramic Process Sequence-Type A, the group of discs is machined to final dimensions to produce a third group of friction discs. The third group of friction discs is then tested in the same manner as discussed in the Ceramic Process Sequence-Type A, and the test results are carefully compared with the test results of the first and second groups of friction discs.

Figure 2:
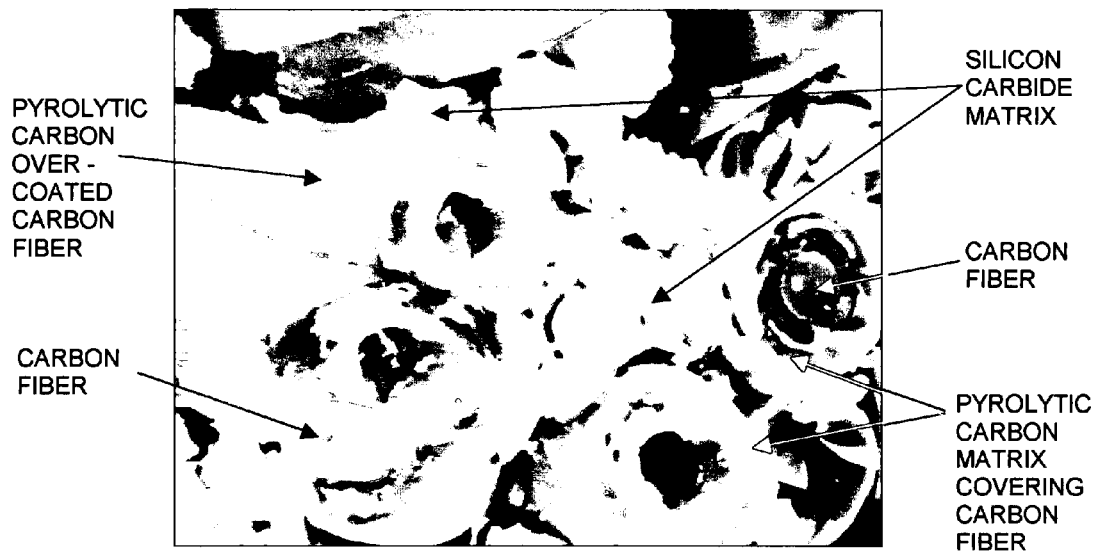
FIG. 2 is a scanning electron microscope image at a magnification of 2000 of a typical partially CVI carbon densified 3D needled PAN fiber carbon/carbon preform, following pre-ceramic polymer impregnation and carbide conversion at 1600° C.

SEM images shown in FIG. 1 and FIG. 2 of the drawings illustrate a typical carbon/ceramic friction material manufactured according to this invention, using a light level of pre-ceramic polymer as SiC friction modifier source. For this material the needled PAN fiber carbon/carbon preform had been CVI carbon densified to a density of 1.4 g/cc-1.6 g/cc and heat treated to 1600° C.-2500° C. The carbon/carbon preform had next been exposed to three pre-ceramic polymer runs, cured and pyrolyzed.

Following the final pyrolyzation at 1600° C. and machining, the carbon/ceramic composite had reached a density of 1.71 g/cc.

The photomicrographs show a light, uniform distribution of the beta-SiC throughout the open pore structure of the composite.

Ceramic Phase Processing by Chemical Vapor Infiltration Technique

In yet another form of the invention a carbon/carbon preform with optimized density and porosity level, heat treated to the appropriate temperature, has the hard, ceramic friction modifier phase introduced by the Chemical Vapor Infiltration (CVI) Process.

Ceramic Process Sequence-Type D Carbon/Ceramic Material (1-2 SiC Chemical Vapor Infiltration Runs)

For this material concept a needled PAN fiber carbon mat substrate is densified by chemical vapor infiltration (CVI) of carbon at a deposition temperature of approximately 1000° C. at a pressure of about 15 mm with a methane ($CH_4$) flow rate of about 220 SCFH. The deposition time per run is between about 75 and about 120 hours. In this form of the method of the invention three or four infiltration runs are accomplished to achieve a carbon/carbon sample density after densification of about 1.4 g/cc to about 1.6 g/cc. Following CVI carbon densification, the carbon/carbon composite is heat-treated at a temperature of between about 1600° C. and about 2500° C.

The resulting composite is then machined to remove at least 0.050 inch per side from each friction surface and at least 0.250 inch per side from the inside and outside diameters. The carbon/carbon preforms are now ready for CVI SiC processing.

In carrying out SiC Chemical Vapor Infiltration Run No. 1 of the Ceramic Process Sequence-Type D, a selected heat-treated carbon/carbon disc preform, (such as a porous precursor substrate formed by infiltrating a first carbon fiber disc with pyrolytic carbon, with a carbon/carbon preform density level in the approximate range of 1.4 g/cc to 1.6 g/cc), is first stacked in the hot zone of a high temperature vacuum reactor with spacers between each disc to allow access by the carbide forming gas phase to infiltrate the disc cross-section of each carbon/carbon preform, reaching all open porosity throughout the discs.

The reactor hot zone is brought to the appropriate deposition temperature with the required reactor pressure and gas flow rate to allow maximum part density to be reached for the selected infiltration conditions and number of deposition hours selected.

Following cooling of the parts in an inert atmosphere, the first group of infiltrated discs is removed from the reactor and machined to remove at least 0.025" from all surfaces in preparation for the second CVI SiC reactor run.

In carrying out SiC Chemical Vapor Infiltration Run No. 2 of the Ceramic Process Sequence-Type D, the first SiC infiltrated preforms are again placed into the SiC chemical vapor deposition reactor and infiltrated as described for the SiC Chemical Vapor Infiltration Run No. 1, except the time under deposition conditions is adjusted in order to achieve the as-infiltrated part density goal of approximately 1.6 g/cc-1.7 g/cc.

This done, the second group of infiltrated friction discs thus formed is machined to final dimensions. Next, this group of friction discs is tested to determine strength and friction characteristics.

The friction discs are placed on a dynamometer in the configuration of rotors and stators in a multi-disc wheel set and tested under typical aircraft braking conditions over a range of operating conditions representative of landing, taxi, over-load and rejected takeoff conditions. Additionally, the compressive strength, fracture toughness and thermal conductivity of the discs are tested. Finally, using microscopy techniques the level of the pyrolytic carbon deposition, carbon fiber/carbon matrix interface and the distribution of SiC within the discs are determined and the density and the open porosity exhibited by the parts are determined, all in a manner well understood by those skilled in the art.

Figure 3:
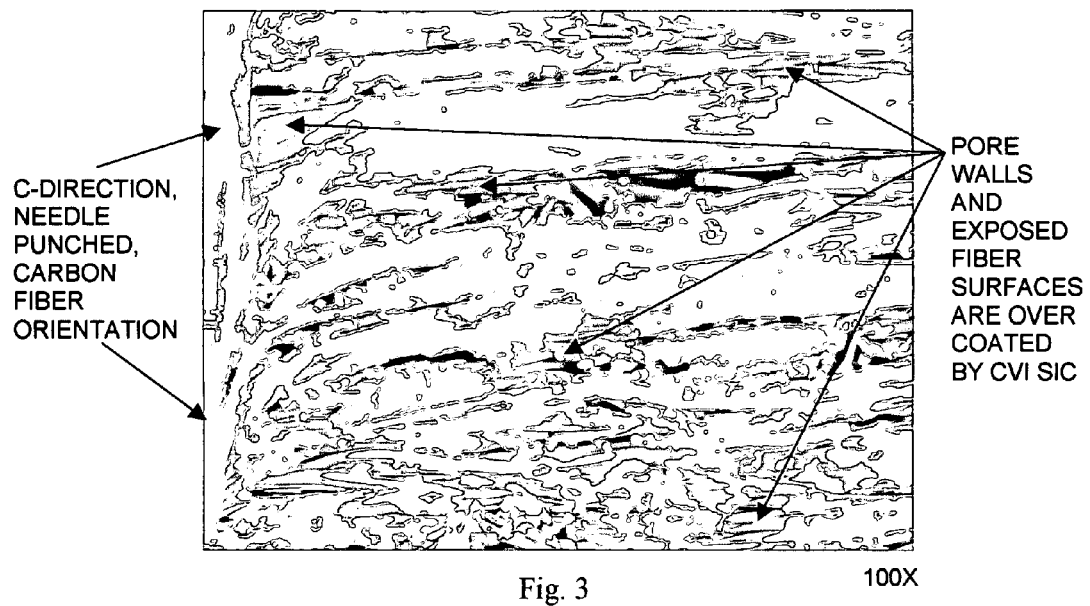
FIG. 3 is a scanning electron microscope image at a magnification of 100 of a typical partially CVI carbon densified 3D needled PAN fiber carbon/carbon preform, following additional densification by CVI Silicon carbide process.
Figure 4:
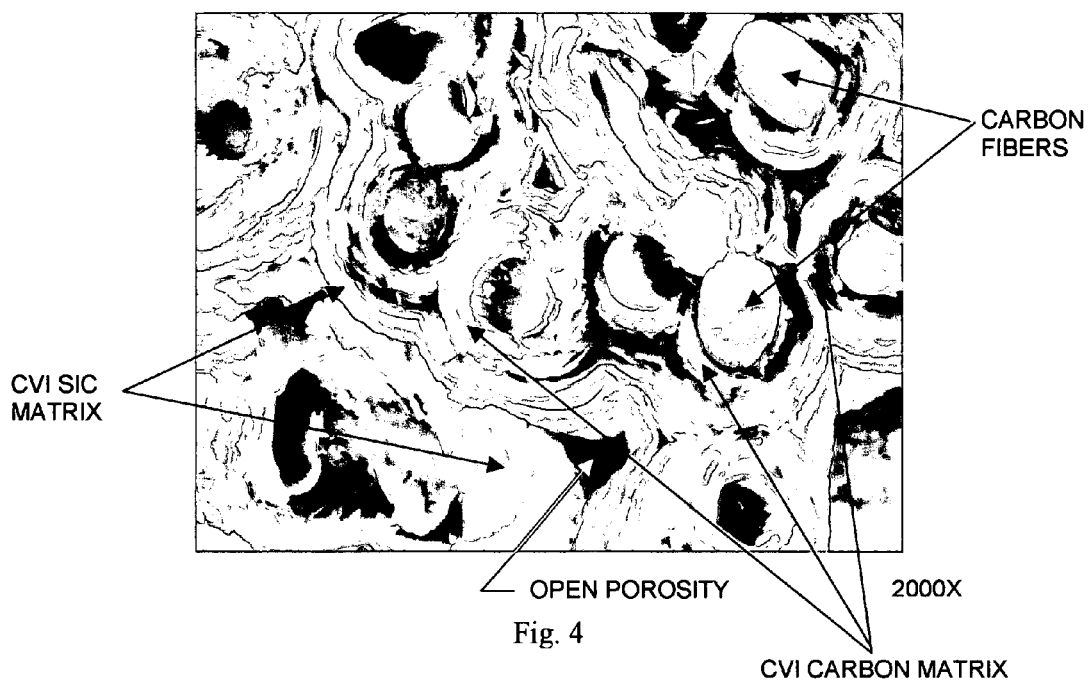
FIG. 4 is a scanning electron microscope image at a magnification of 2000 of a typical partially CVI carbon densified 3D needled PAN fiber carbon/carbon preform, following CVI SIC processing.

SEM images shown in FIG. 3, FIG. 4 and FIG. 5 of the drawings illustrate a typical carbon/ceramic friction material manufactured according to this invention, using CVI SiC as friction modifier source. For this material the needled PAN fiber carbon/carbon preform had been CVI carbon densified to a density of approximately 1.4 g/cc and heat treated to 1600° C.-2500° C. The carbon/carbon preform had next been exposed to only one CVI SiC run. Following machining, the carbon/ceramic composite had reached a density of 1.6 g/cc to 1.7 g/cc. The photomicrographs show a uniform distribution of SiC from the vapor phase throughout the open pore structure of the composite.

Using the aforementioned comparison of test results it is possible to create a new family of high performance friction materials with tailored levels of a ceramic hard phase to allow optimization of thermal conductivity, friction coefficient and wear performance of carbon/ceramic composite brake materials for use in the production of novel vehicle brakes.

By way of summary, reference to the drawings will further illustrate the construction of carbon/ceramic brake materials as manufactured in accordance with the methods of the invention. The needled, PAN fiber, carbon/carbon preforms used in the materials illustrated, were first densified with pyrolytic, CVI carbon to a pre-determined density of 1.4 g/cc-1.6 g/cc and heat-treated to 1600° C.-2500° C. prior to any ceramic processing.

The densification level for the carbon/carbon preform was specifically designed to assure that the required level of hard ceramic phase versus softer carbon/carbon phase was achieved in the final product.

Additionally, heat-treatment of the carbon/carbon preform was required to make sure that the thermal conductivity for the final carbon/ceramic friction material was at the required level to achieve the friction and wear properties desired for a specific aircraft application.

The micro-structural images shown in the drawings, are for two ceramic modified carbon/carbon preforms; one using a pre-ceramic polymer as SiC friction modifier, pyrolyzed to 1600° C., (See FIG. 1 and FIG. 2) and a second set of images illustrating carbon/carbon material with the friction modifier introduced via the CVI SiC process (See FIG. 3, FIG. 4 and FIG. 5).

FIG. 1 illustrates a needled PAN fiber substrate, carbon/carbon preform densified with CVI carbon to a density of approximately 1.4 g/cc and heat-treated. The carbon/carbon preform was next exposed to three pre-ceramic polymer impregnation runs, cured and pyrolyzed. The final pyrolyzation run was carried out at 1600° C. Following the three pre-ceramic polymer impregnation runs and pyrolyzation, the material had reached an approximate density of 1.7 g/cc.

The FIG. 1 image, at 100×, was generated by scanning electron microscope (SEM) back-scatter technique. It illustrates uniform distribution of the beta-SiC phase throughout the open pore structure of the needled, PAN fiber carbon/carbon preform.

FIG. 2 shows the same material as FIG. 1, but at a higher magnification. FIG. 2 was taken by SEM technique at 200× of a purposely-fractured sample to allow observation of the carbon fiber/CVI carbon matrix interface and the placement of the pyrolyzed SiC friction modifier in available open pores.

The particular sample shown had not yet been exposed to a final CVI carbon densification run aimed at holding the ceramic friction modifier in place, while further improving the thermal conductivity of the end product.

The images shown in FIGS. 3, 4 and 5 also represent a carbon/carbon preform based on a needled PAN fiber substrate. Again, the carbon/carbon preform was densified to a specific density level and heat-treated. The carbon/carbon material shown in FIGS. 3, 4 and 5 had been CVI carbon densified to approximately 1.4 g/cc prior to ceramic processing. The friction modifier in this case is SiC introduced into the open pores of the carbon/carbon preform by chemical vapor infiltration technique.

FIG. 3 shows an even penetration and distribution of the CVI SiC friction modifier product throughout the available open pores. The SiC is deposited on the pore walls and available fiber surfaces. The CVI SiC shown in FIG. 3, FIG. 4 and FIG. 5 had been deposited by one chemical vapor infiltration run, resulting in a material density of approximately 1.6 g/cc to 1.7 g/cc.

FIG. 4 and FIG. 5 are images at higher magnification (2000× and 5000×), again of the same material, but of a purposely-fractured surface.

FIG. 4 and FIG. 5 illustrate the CVI carbon matrix deposited around the carbon fibers, it also illustrates the uniform over-coating of pore walls and fibers in the carbon/carbon preform with a thin layer of CVI SiC friction modifier.

Having now described the invention in detail in accordance with the requirements of the patent statutes, those skilled in this art will have no difficulty in making changes and process modifications in the individual parts or their relative assembly in order to meet specific requirements or conditions. Such changes and modifications may be made without departing from the scope and spirit of the invention as set forth in the following claims.

I claim:

1. A method of making a ceramic matrix composite and correlating the resulting composite with vehicle braking performance requirements, the method comprising the steps of:
    (a) infiltrating a first carbon fiber substrate with pyrolytic carbon to reach a porosity level suitable for impregnation with a pre-ceramic polymer to form a porous precursor substrate;
    (b) impregnating said porous precursor substrate with a pre-ceramic polymer to form a first impregnated part;
    (c) heating said first impregnated part within an inert gaseous atmosphere to a temperature of about 400 degrees C. for about one hour to form a first cured part;
    (d) heating said first cured part to a temperature of about 1,000 degrees C. for about one hour to form a first impregnated preform;
    (e) impregnating said first impregnated preform with a pre-ceramic polymer to form a further impregnated first impregnated preform;

(f) heating said further impregnated first preform within an inert gaseous atmosphere to a temperature of about 400 degrees C. for about one hour to form a cured second impregnated preform;

(g) heating said cured second impregnated preform to a temperature of about 1,000 degrees C. for about one hour to form a pyrolyzed second impregnated preform;

(h) machining said pyrolyzed second impregnated preform to form a third impregnated preform;

(i) impregnating said third impregnated preform with a pre-ceramic polymer to form a further impregnated third impregnated preform;

(j) heating said further impregnated third impregnated preform within an inert gaseous atmosphere to a temperature of about 400 degrees C. for about one hour to form a cured fourth impregnated preform;

(k) heating said cured fourth impregnated preform to about 1600 degrees C. for about eight hours to produce a fifth impregnated preform;

(l) machining said fifth impregnated preform to form a sixth impregnated preform;

(m) heating said sixth impregnated preform to a temperature of about 1000 degrees C. to form a heated sixth impregnated preform;

(n) infiltrating said heated sixth impregnated preform with methane gas to form a first friction disc;

(o) machining said first friction disc to final dimensions to form a final friction disc;

(p) subjecting said final friction disc to dynamic testing to determine its strength and friction characteristics; and (q) subjecting said final friction disc to further testing to determine the level of the carbon vapor infiltration and the distribution of SiC within said final friction disc.

* * * * *